UNITED STATES PATENT OFFICE.

THOMAS A. WOMACK, OF BATON ROUGE, LOUISIANA.

PAVING-BLOCK.

1,007,621.  Specification of Letters Patent.  Patented Oct. 31, 1911.

No Drawing. Application filed August 1, 1910, Serial No. 574,854. Renewed April 26, 1911. Serial No. 623,465.

*To all whom it may concern:*

Be it known that I, THOMAS A. WOMACK, a citizen of the United States, residing at Baton Rouge, in the parish of East Baton Rouge and State of Louisiana, have invented certain new and useful Improvements in Paving-Blocks; and I do hereby declare the following to be a full, clear, and exact description of the invention, such as will enable others skilled in the art to which it appertains to make and use the same.

My invention relates to improvements in paving blocks which may be used for paving streets, sidewalks, foundations, piers, and various similar uses, and the object of my invention is to make a cheap and effective block and one which will not absorb moisture, will not contract after being laid, and will not run or melt under the heat of the sun.

Further objects are to make a pavement which is substantially noiseless and very durable.

In carrying out my invention, I take the following ingredients in the following proportions: sawdust, 34 pounds; tar, 18 pounds; sharp sand, 34 pounds; cement, 5 pounds; crude sulfur, 5 pounds; pine rosin, 8 pounds; black strap molasses, 9 pounds.

The sawdust is used as a filler and almost any kind of waste material could be used, such as chopped straw, etc.

In carrying my invention into effect, I mix all the materials except the sawdust together thoroughly by stirring them in an agitator of any well known or preferred construction. After the materials are thoroughly mixed, they form an excellent cement and by the addition of the sawdust or other waste material, which is thoroughly mixed with the same, the mass becomes plastic and can be pressed into paving blocks of any desired size. These paving blocks are noiseless, wear excellently, do not contract, and do not absorb moisture to any appreciable extent. They can be readily repaired and practical use has shown them to be cheap, inexpensive, and durable.

I claim:—

1. A cement composition, composed of tar, sharp sand, cement, crude sulfur, pine rosin, and black strap molasses thoroughly mixed together, substantially as described.

2. A cement composed of the following ingredients in the following proportions mixed together:—18 pounds of tar, 34 pounds of sharp sand, 5 pounds of cement, 5 pounds of crude sulfur, 8 pounds of pine rosin, and 9 pounds of black strap molasses, substantially as described.

3. A paving material composed of the following ingredients thoroughly mixed together:—sawdust, tar, sharp sand, cement, crude sulfur, pine rosin, and black strap molasses, substantially as described.

4. A paving material composed of the following ingredients mixed together in the following proportions:—sawdust, 34 pounds; tar, eighteen pounds; sharp sand, 34 pounds; cement, five pounds; crude sulfur, 5 pounds; pine rosin, 8 pounds; and black strap molasses, 9 pounds, substantially as described.

In testimony whereof, I affix my signature, in presence of two witnesses.

THOMAS A. WOMACK.

Witnesses:
CLAUDE J. LATIL,
DUDLEY L. WEBER.